US006118276A

United States Patent [19]

Nakata et al.

[11] Patent Number: 6,118,276

[45] Date of Patent: Sep. 12, 2000

[54] ION CURRENT DETECTION DEVICE

[75] Inventors: Koichi Nakata; Kazuhisa Mogi, both of Susono; Youichi Kurebayashi, deceased, late of Toyohashi, all of Japan, by Harumi Kurebayashi, legal representative

[73] Assignees: Toyota Jidosha Kabushiki Kaisha, Toyota; Denso Corporation, Kariya, both of Japan

[21] Appl. No.: 09/078,530

[22] Filed: May 13, 1998

[30] Foreign Application Priority Data

May 15, 1997 [JP] Japan .................................... 9-125660

[51] Int. Cl.[7] .......................... F02P 17/12; G01M 15/00; G01N 27/62

[52] U.S. Cl. .......................... 324/464; 324/380; 324/388; 324/399; 73/35.08; 73/116

[58] Field of Search .................................... 324/378, 380, 324/388, 391, 393, 399, 464; 73/35.01, 35.06, 35.08, 116, 117.2, 117.3

[56] References Cited

U.S. PATENT DOCUMENTS 4,444,172 4/1984 Sellmaier et al. .
5,230,240 7/1993 Ohsawa et al. .......................... 73/116
5,337,716 8/1994 Fukui et al. .......................... 123/425
5,343,844 9/1994 Fukui et al. .......................... 123/481
5,483,818 1/1996 Brandt et al. .......................... 73/35.01
5,548,220 8/1996 Kawamoto et al. .................... 324/399
5,561,239 10/1996 Yasuda .................................. 73/35.08
5,563,332 10/1996 Yasuda .................................. 73/35.08
5,675,072 10/1997 Yasuda et al. ......................... 73/35.08
5,781,012 7/1998 Yasuda ....................................... 324/3
5,866,808 2/1999 Ooyabu et al. .......................... 73/116
5,959,192 9/1999 Mogi et al. ............................ 73/35.08

FOREIGN PATENT DOCUMENTS 61-57830 3/1986 Japan .
6159129 6/1994 Japan .
8-200195 8/1996 Japan .

*Primary Examiner*—Glenn W. Brown
*Attorney, Agent, or Firm*—Kenyon & Kenyon

[57] ABSTRACT

An ion current detection device is disclosed that is designed to hold an ion current output voltage within a prescribed limit to ensure proper operation of a processing device connected to the output side thereof, while, at the same time, shortening the decay time of the LC resonance associated with an ignition coil. An ion current flows from one end of a capacitor and back to the other end thereof passing through an ignition coil secondary winding, a spark plug, an ion current detecting resistor, and a load resistor. A voltage equal to −(ion current value)×detecting resistor value appears at a node between the ion current detecting resistor and the load resistor. This voltage is inverted by an inverting circuit and supplied as an ion current output to the processing circuit. The resistance value R1 of the ion current detecting resistor and the resistance value R2 of the load resistor are chosen to satisfy two requirements, that is, to hold the ion current output within supply voltage and to quickly attenuate and reduce the noise (LC resonance current) caused by the ignition coil.

2 Claims, 6 Drawing Sheets

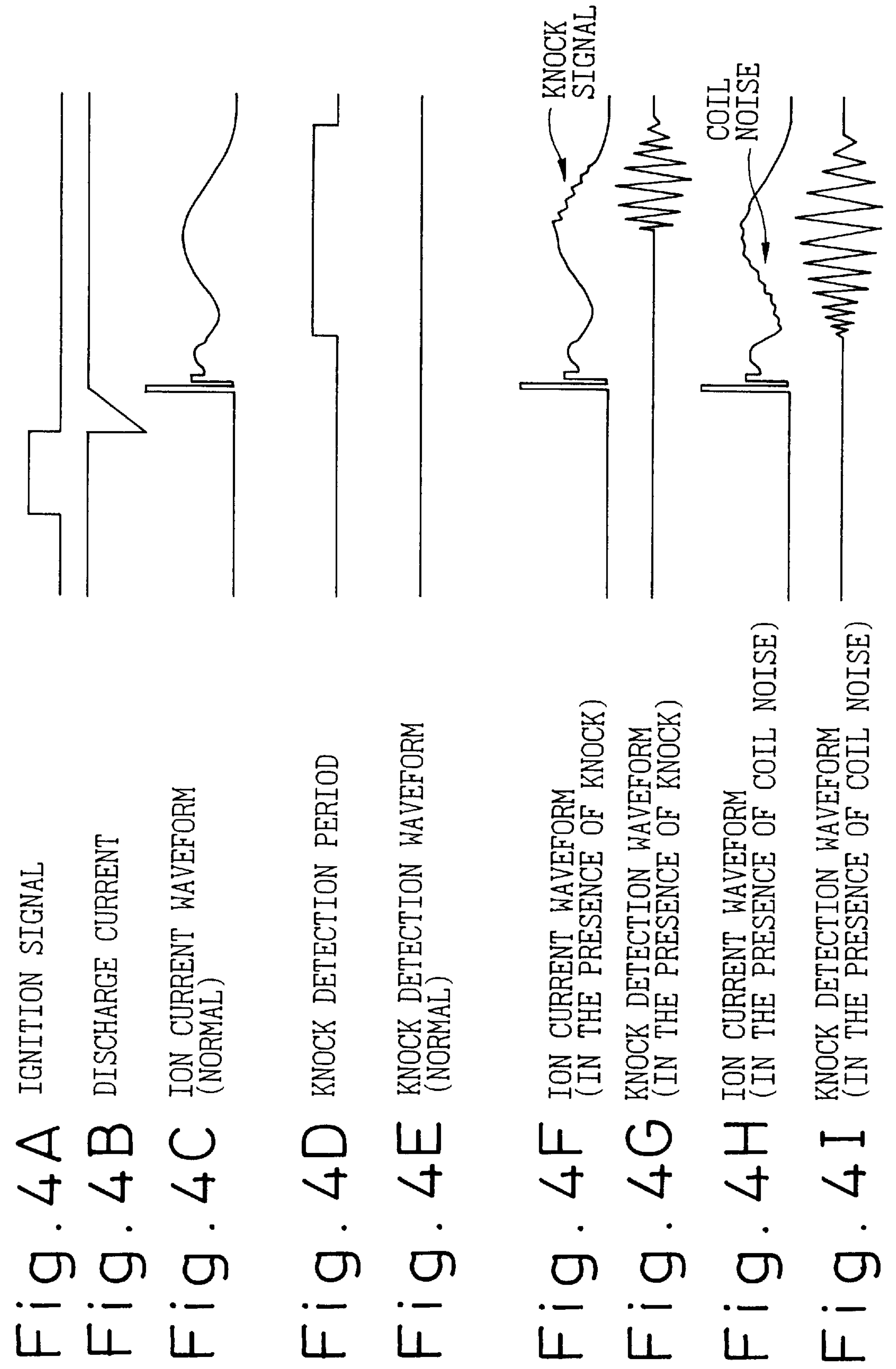
Fig. 4A IGNITION SIGNAL
Fig. 4B DISCHARGE CURRENT
Fig. 4C ION CURRENT WAVEFORM (NORMAL)
Fig. 4D KNOCK DETECTION PERIOD
Fig. 4E KNOCK DETECTION WAVEFORM (NORMAL)
Fig. 4F ION CURRENT WAVEFORM (IN THE PRESENCE OF KNOCK)
Fig. 4G KNOCK DETECTION WAVEFORM (IN THE PRESENCE OF KNOCK)
Fig. 4H ION CURRENT WAVEFORM (IN THE PRESENCE OF COIL NOISE)
Fig. 4I KNOCK DETECTION WAVEFORM (IN THE PRESENCE OF COIL NOISE)
KNOCK SIGNAL
COIL NOISE

ION CURRENT DETECTION DEVICE

BACKGROUND OF THE INVENTION

1. Field of the Invention

The present invention relates to an ion current detection device provided in connection with an ignition device to detect the combustion state of an internal combustion engine based on an ion current inside a combustion chamber.

2. Description of the Related Art

In an internal combustion engine, control must be performed to prevent misfiring and abnormal combustion phenomena such as knocking and preignition (premature ignition). One method proposed to detect the combustion state of an internal combustion engine measures an ion current inside the combustion chamber and detects the combustion state based on the ion current.

More specifically, when a spark is produced at the spark plug and air/fuel mixture burns in the combustion chamber, the air/fuel mixture is ionized. When the mixture is in the ionized state, if a voltage is applied to the spark plug, an ion current flows. Abnormal occurrences such as knocking, preignition, and misfiring can be detected by detecting and analyzing this ion current.

Japanese Unexamined Patent Publication No. 8-200195, for example, discloses one such ion current detection device. In this device, a capacitor as an ion current generating source is charged to a given voltage by the secondary current that flows when the primary current in the ignition coil is shut off; then, a current that flows through a closed circuit consisting of the capacitor, the secondary winding of the ignition coil, the spark plug, and an ion current detecting resistor, after a spark discharge, is measured as a voltage across the ion current detection resistor.

In this ion current detection device, the ion current detection voltage increases as the resistance of the ion current detecting resistor increases. Here, a processing device, connected to the output side of the ion current detection device, performs prescribed processing using the ion current detection voltage as an input voltage. Since the processing device is mounted in a vehicle, a battery voltage is used as the supply voltage for the processing device. Therefore, if the resistance of the ion current detecting resistor is increased excessively, the input voltage, i.e., the ion current detection voltage, exceeds the supply voltage when an ion current larger than a certain value flows, and reaches saturation in the processing device. If this happens, not only does it become impossible to detect the high-frequency knock signal contained in the ion current, but discontinuities are caused in the ion current at saturation points, introducing large noise into the signal passed through a filter.

On the other hand, if the resistance of the ion current detecting resistor is reduced, noise associated with the ignition coil increases, degrading knock detectability. That is, after the end of the discharge at the spark plug, the ignition coil contains residual magnetic energy and attempts to discharge this energy, causing LC resonance through interaction with the stray capacitance on the high-voltage line. This LC resonance causes noise. Further, when the ion current flows into the ignition coil, this current flow triggers the generation of a very small LC resonance in the ignition coil, which also adds to the noise. The LC resonance frequency of the ignition coil is generally 4 to 8 kHz, which is very close to the knock frequency (6 to 8 kHz). As a result, once LC resonance occurs, it is difficult to separate its noise component from the knock signal component using a knock detection filter. Therefore, if the resistance of the ion current detection resistor is made too small, noise caused by the LC resonance cannot be attenuated, resulting in a degradation of the accuracy for the detection of knock and other abnormal combustion phenomena.

SUMMARY OF THE INVENTION

In view of the above situation, it is an object of the present invention to provide an ion current detection device which is designed to hold the ion current output voltage within a prescribed limit to ensure proper operation of the processing device connected to the output side thereof, while, at the same time, shortening the decay time of the LC resonance associated with the ignition coil.

To accomplish the above object, the present invention employs the technical configurations described below, the basic concept being the separation of functions by providing an ion current detecting resistor independently of a load resistor used to cause the LC resonance to decay.

More specifically, according to a first aspect of the present invention, there is provided an ion current detection device comprising: a diode, connected in series to a spark plug and an ignition coil secondary winding, for passing current only in the direction of a secondary current that flows when an ignition coil primary current is shut off; a capacitor connected in series with the spark plug, the ignition coil secondary winding, and the diode, and acting as an ion current generating source; a voltage-regulator diode, connected in parallel to the capacitor, for limiting a voltage, to be charged into the capacitor by the ignition coil secondary current, to within a specified value; a series connection of a detecting resistor and a load resistor, connected in parallel to the diode and forming an ion current path together with the capacitor, the ignition coil secondary winding, and the spark plug; and an inverting circuit connected to a node between the detecting resistor and the load resistor.

According to a second aspect of the present invention, the relation $R1<R2$ is preferably set between the resistance value R1 of the detecting resistor and the resistance value R2 of the load resistor.

According to a third aspect of the present invention, the relation $Vz\times\{R1/(R1+R2)\}<Vb$ is preferably set between the resistance value R1 of the detecting resistor and the resistance value R2 of the load resistor, where Vz is the maximum voltage of the capacitor limited by the voltage-regulator diode, and Vb is the supply voltage of the device.

According to a fourth aspect of the present invention, there is provided an ion current detection device comprising: a diode, connected in series with a spark plug and an ignition coil secondary winding, for passing current only in the direction of a secondary current that flows when an ignition coil primary current is shut off; a capacitor connected in series with the spark plug, the ignition coil secondary winding, and the diode, and acting as an ion current generating source; a voltage-regulator diode, connected in parallel with the capacitor, for limiting a voltage, to be charged into the capacitor by the ignition coil secondary current, within a specified value; and an inverting amplifier circuit, connected to a node between the capacitor and the diode, for inverting and amplifying a voltage value appearing at the node between the capacitor and the diode, the inverting amplifier circuit forming an ion current path together with the capacitor, the ignition coil secondary winding, and the spark plug, and comprising an operational amplifier, an input resistor connected to an inverting input terminal of the operational amplifier, and a feedback resistor directed from an output terminal of the operational amplifier to the inverting input terminal.

According to a fifth aspect of the present invention, the relation Rf<Ra is preferably set between the resistance value Rf of the feedback resistor and the resistance value Ra of the input resistor.

According to a sixth aspect of the present invention, the relation Vz×(Rf/Ra)<Vb is preferably set between the resistance value Rf of the feedback resistor and the resistance value Ra of the input resistor, where Vz is the maximum voltage of the capacitor limited by the voltage-regulator diode, and Vb is the supply voltage of the device.

In the ion current detection device according to the first or fourth aspect of the present invention, the ion current output voltage is held within a prescribed limit to ensure proper operation of the processing device connected to the output side of the device, while, at the same time, shortening the decay time of the LC resonance associated with the ignition coil. This improves the accuracy of ion current detection. In the ion current detection device according to the second or fifth aspect of the present invention, it becomes possible to greatly limit the ion current output voltage and to significantly shorten the decay time of the LC resonance, making ion current signal discrimination easier. Further, in the ion current detection device according to the third or sixth aspect of the present invention, the ion current output voltage can be held reliably below the supply voltage, ensuring the accurate detection of the combustion state based on the ion current signal under all circumstances.

BRIEF DESCRIPTION OF THE DRAWINGS

Further features and advantages of the present invention will be apparent from the following description with reference to the accompanying drawings, in which:

FIGS. 4A, 4B, 4C, 4D, 4E, 4F, 4G, 4H, and 4I are diagrams for explaining a method of knock detection based on the ion current;

DESCRIPTION OF THE PREFERRED EMBODIMENTS

The preferred embodiments of the present invention will be described below with reference to the accompanying drawings.

Figure 1:
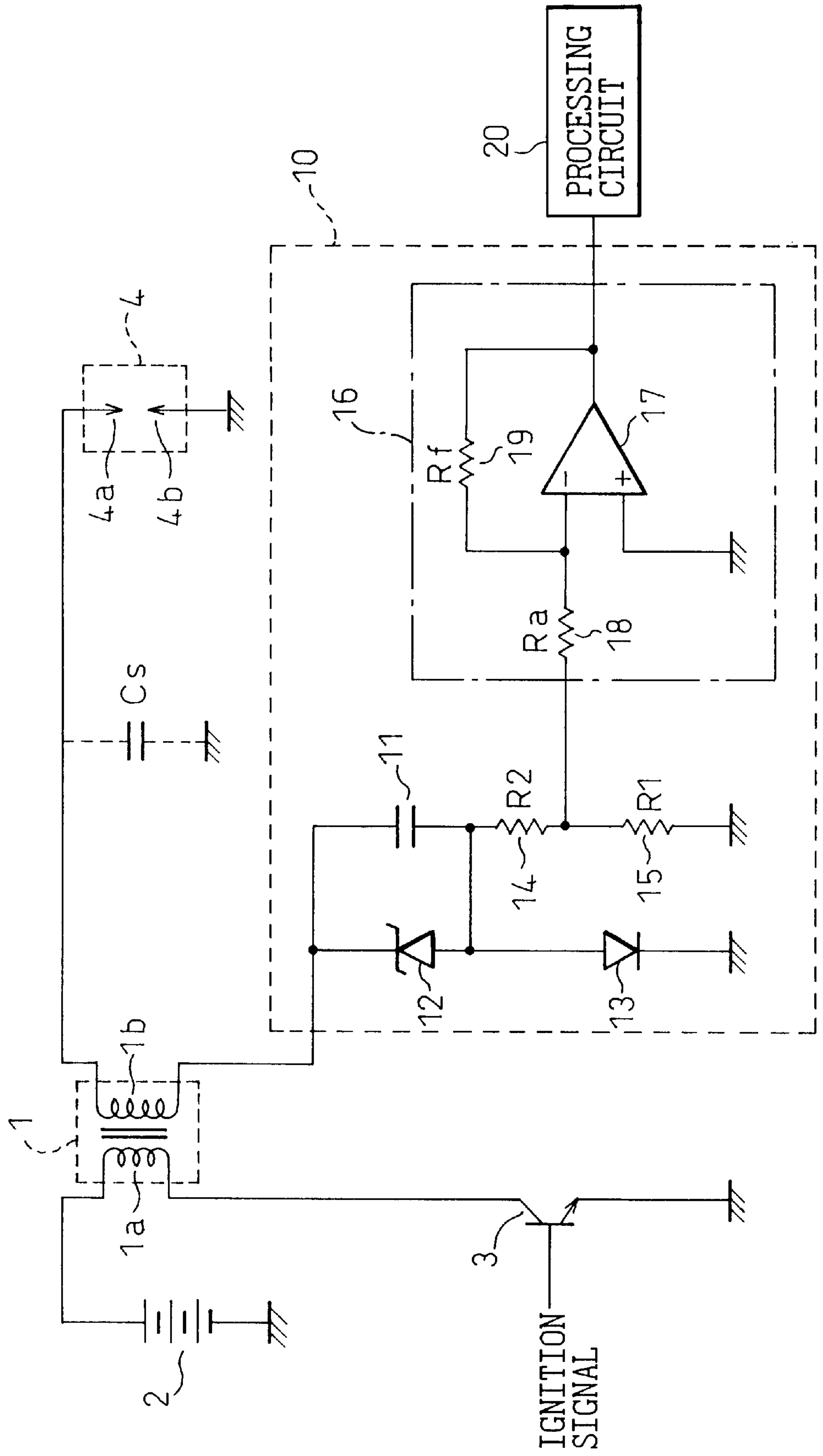
FIG. 1 is a diagram showing the circuit configuration of an ion current detection device according to a first embodiment of the present invention along with an ignition device.

FIG. 1 is a diagram showing the circuit configuration of an ion current detection device according to a first embodiment of the present invention along with an ignition device. One end of the primary winding la of an ignition coil 1 is connected to the positive electrode of a battery 2, and the other end thereof is connected to the collector of a switching transistor 3. The emitter of the transistor 3 is grounded, and an ignition signal is applied to its base. One end of the secondary winding 1*b* of the ignition coil 1 is connected to the center electrode 4*a* of a spark plug 4. The outer electrode 4*b* of the spark plug 4 is grounded.

An ion current detection circuit 10 is provided at the other end of the secondary winding 1*b* of the ignition coil 1. A capacitor 11 as an ion current generating source is connected to the secondary winding 1*b*. Connected in parallel with this capacitor 11 is a voltage-regulator diode (Zener diode) 12 by which the voltage to be charged into the capacitor 11 by the ignition coil secondary current is limited to within a specified value. The other end of the capacitor 11 is grounded via a diode 13 which passes current to the ground, and is grounded via a series connection of a load resistor 14 and an ion current detecting resistor 15.

The node between the load resistor 14 and the ion current detecting resistor 15 is connected to an inverting amplifier circuit 16. This inverting amplifier circuit 16 consists of an operational amplifier 17 whose noninverting input terminal (+terminal) is grounded; an input resistor 18 connected to the inverting input terminal (−terminal) of the operational amplifier 17; and a feedback resistor 19 connected from the output terminal to the inverting input terminal (−terminal) of the operational amplifier 17. Denoting the resistance value of the input terminal 18 by Ra and that of the feedback resistor 19 by Rf, the voltage amplification gain is given by −Rf/Ra, as is well known. In this embodiment, since Rf=Ra, the inverting amplifier circuit 16 is simply an inverting circuit. The output of the inverting circuit 16 is directed to a processing circuit 20 which performs signal processing for knock determination, etc. Here, Ra and Rf are set larger than R1 and R2.

Figure 2:
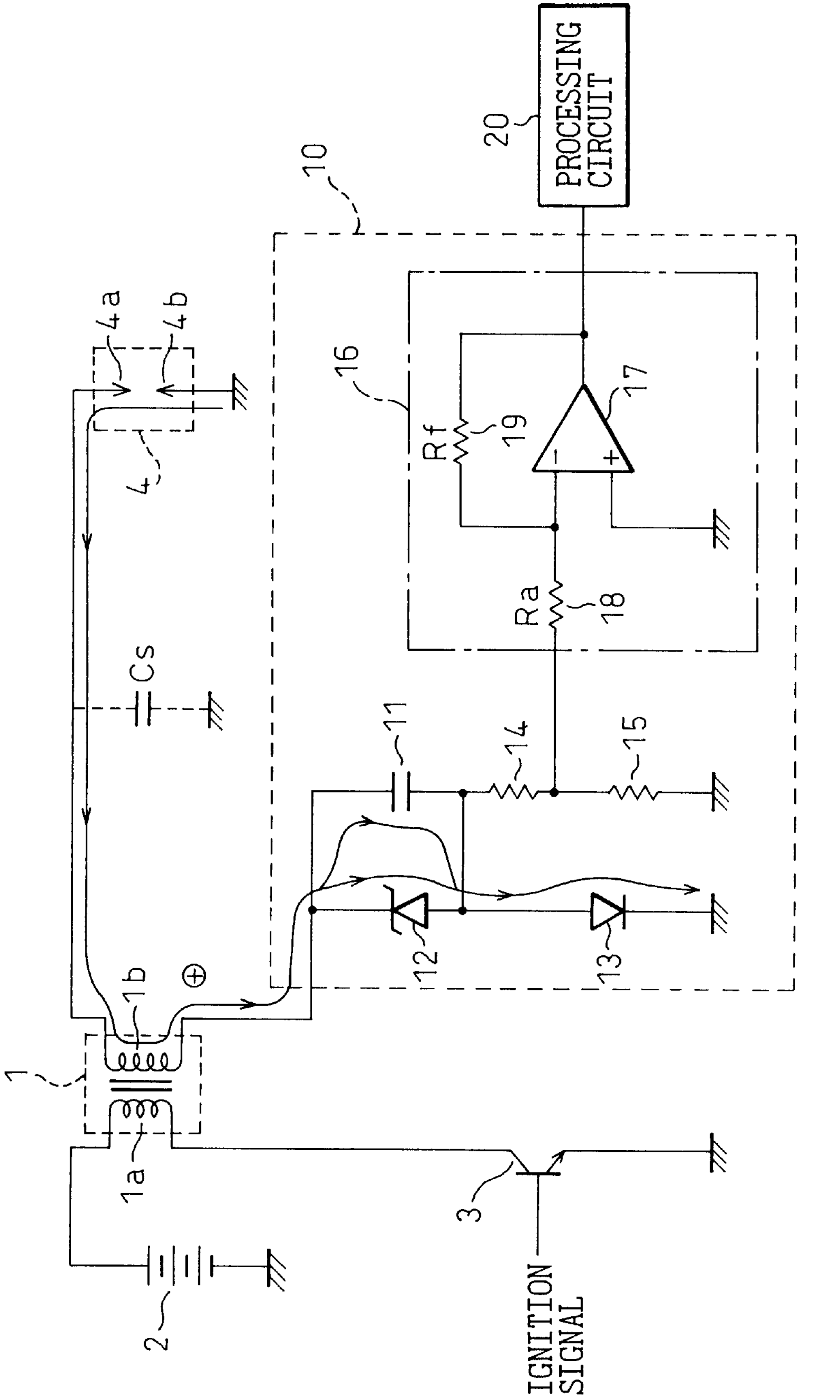
FIG. 2 is a diagram for explaining the flow of a discharge current when a spark discharge occurs at a spark plug.

Next, the operation of the ion current detection circuit 10 will be described. First, when the ignition signal goes active and the transistor 3 is on, a current flows through the primary winding la of the ignition coil. Next, when the ignition signal is set inactive and the transistor 3 is turned off, the primary current is shut off, inducing a high voltage in the secondary winding 1*b* of the ignition coil 1 and thus causing a spark to occur at the spark plug 4. That is, when a high negative voltage is applied to the center electrode 4*a* of the spark plug 4, an electric arc or spark is produced between the center electrode 4*a* and the outer electrode (ground electrode) 4*b*, and a current flows from the secondary winding 1*b* of the ignition coil, the current flowing back to the secondary winding 1*b* through the capacitor 11, the voltage-regulator diode 12, the diode 13, and the spark plug 4, as shown in FIG. 2. During this process, the capacitor 11 is charged to a voltage equal to the Zener voltage (about 100 volts) of the voltage-regulator diode 12.

Figure 3:
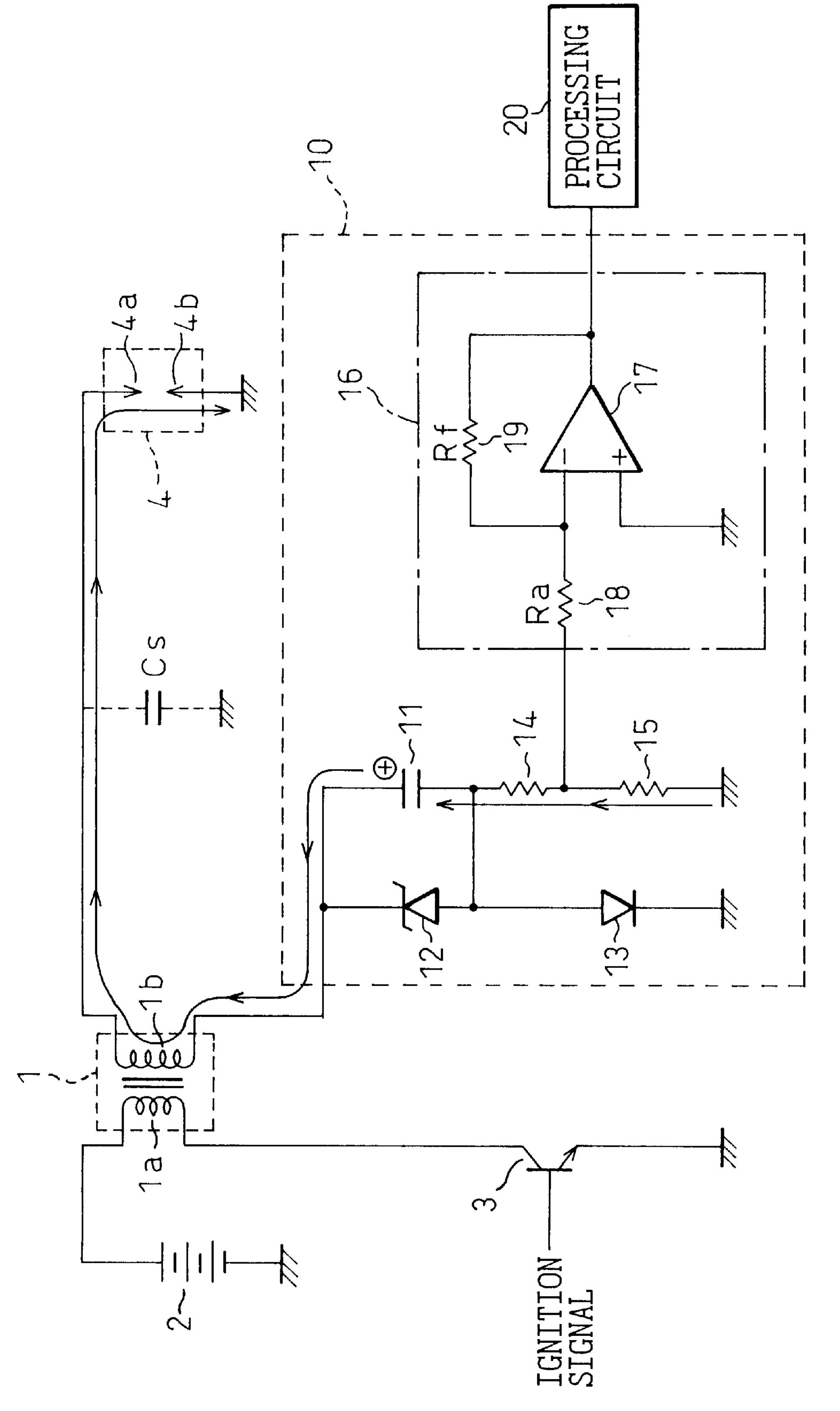
FIG. 3 is a diagram for explaining the flow of an ion current after the spark discharge.

When the air/fuel mixture inside the combustion chamber is burned after being ignited by the spark at the spark plug 4, the air/fuel mixture is ionized. When the mixture is in the ionized state, conductivity is maintained across the gap between the two electrodes of the spark plug 4. Furthermore, since a voltage is applied between the two electrodes of the spark plug 4 by the charged voltage of the capacitor 11, an ion current flows. This ion current flows from one end of the capacitor 11 and back to the other end thereof passing through the ignition coil secondary winding 1*b*, the spark plug 4, the ion current detecting resistor 15, and the load resistor 14, as shown in FIG. 3. Then a voltage equal to −(ion current value)×detecting resistor value appears at the node between the ion current detecting resistor 15 and the load resistor 14, and this voltage is inverted by the inverting circuit 16. Finally, the output of the inverting circuit 16 is supplied as the ion current output to the processing circuit 20.

FIGS. 4A, 4B, 4C, 4D, 4E, 4F, 4G, 4H, and 4I are diagrams for explaining a method of knock detection based on the ion current. As shown in FIGS. 4A and 4B, at the instant the ignition signal is turned off, a spark discharge occurs at the ignition plug 4 and a discharge current flows. Then, after the spark discharge, the ignition coil attempts to discharge residual magnetic energy, as a result of which LC resonance occurs between the inductance L of the ignition coil secondary winding 1*b* and the stray capacitance Cs (see FIG. 1) formed in the high voltage line, and an LC resonance current flows. Since this LC resonance current is detected by the ion current detecting resistor, an abrupt change appears in the ion current waveform after the end of the spark discharge, as shown in FIG. 4C, but this change is not due to the ion current. After the LC resonance current due to the residual magnetic energy flows, the ion current flows as shown in FIG. 4C.

In the processing circuit 20 shown in FIG. 1, a knock detection period is set in such a manner as to avoid the LC resonance current due to the residual magnetic energy, as shown in FIG. 4D; by passing the ion current output signal only during this period through a band-pass filter, only the frequency component peculiar to knock is extracted. When knock does not occur, a knock signal does not appear in the band-bass filtered waveform, that is, the knock detection waveform, as shown in FIG. 4E.

On the other hand, when knock has occurred, a high-frequency oscillating component peculiar to knock appears in the ion current waveform, as shown in FIG. 4F. In this case, the high-frequency component appears in the band-pass filtered knock detection waveform as shown in FIG. 4G.

Further, in some cases a situation may occur where, after the abrupt LC resonance current has passed due to the ignition coil residual magnetic energy, as earlier described, a greatly varying ion current flows through the ignition coil, triggering the generation of a very small LC resonance, and this very small LC resonance current is superimposed as noise on the ion current signal, as shown in FIG. 4H. If this LC resonance frequency is close to the knock frequency, a signal indicating that knock had occurred will appear in the knock detection waveform, as shown in FIG. 4I.

In performing the knock detection, the following two requirements must be satisfied.

Requirement 1: Ion current output voltage must not exceed the supply voltage. (Oscillations associated with knock will appear near the peak of the ion current signal; if the ion current output exceeds the supply voltage, processing in the processing circuit is rendered impossible and the oscillating component is therefore cut off.)

Requirement 2: The noise (LC resonance current) caused by the ignition coil must be quickly attenuated and reduced.

Figure 5:
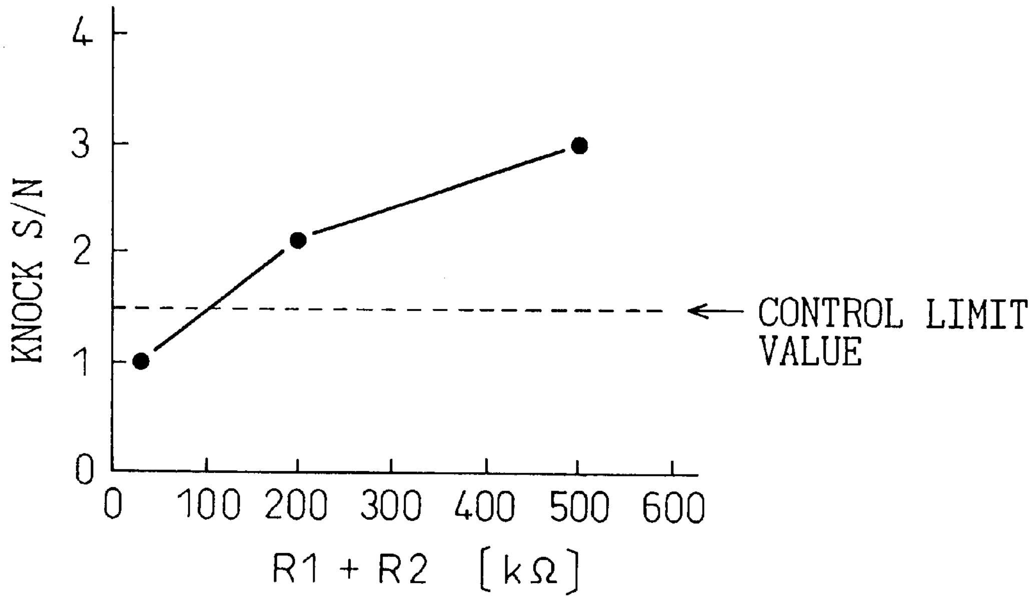
FIG. 5 is a characteristic diagram plotting experimentally obtained results, showing the relationship between the series resistance value R1+R2 of a detecting resistor and a load resistor and the S/N (signal-to-noise ratio) of a knock signal.

First, to satisfy the Requirement 2, the series resistance value of the ion current detecting resistor 15 and load resistor 14 must be made larger than a predetermined value. That is, when the resistance value of the ion current detecting resistor 15 is denoted by R1 and that of the load resistor 14 by R2, R1+R2 must be made larger than a predetermined value. FIG. 5 plots experimentally obtained results, showing the relationship between R1+R2 and the S/N (signal-to-noise ratio) of the knock signal. The S/N must, for example, be made equal to or higher than 1.5 to make knock control possible. In that case, as can be seen from FIG. 5, the relation $$R1+R2>100\ \text{k}\Omega \tag{1}$$

must be satisfied.

To satisfy the Requirement 1, the relation $$Vz\times\{R1/(R1+R2)\}<Vb \tag{2}$$

must be satisfied, where Vz is the charge voltage of the capacitor 11 or the Zener voltage of the voltage-regulator diode 12, and Vb is the voltage of the battery as a power supply for the processing circuit 20. Here, Vz×{R1/(R1+R2)} on the left side represents the value of the voltage applied across the ion current detecting resistor 15 when the resistance between the two electrodes of the spark plug 4 is zero. Since the ion current output voltage does not exceed this value, the Requirement 1 is satisfied if a setting is made so that this value becomes smaller than the battery voltage Vb.

Figure 6:
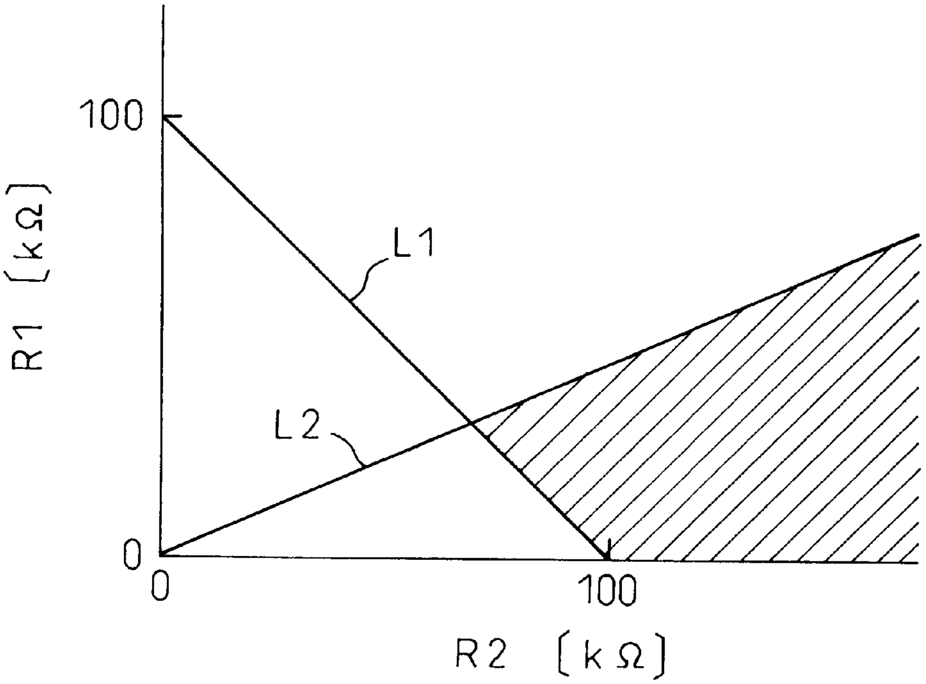
FIG. 6 is a diagram plotting the resistance value R1 of the ion current detection resistor versus the resistance value R2 of the load resistor, defining the condition that R1 and R2 should satisfy.

FIG. 6 is a diagram showing the condition that the resistance value R1 of the ion current detecting resistor 15 and the resistance value R2 of the load resistor 14 should satisfy. The region that satisfies the relation (1) is the region above the line L1, and the region that satisfies the relation (2) is the region under the line L2. The region that simultaneously satisfies both relations, therefore, is the hatched region in the figure. For example, when Vb=12 [v] and Vz=100 [v], if R1+R2=1 [MΩ] from the relation (1), then from the relation (2) R1 must be made smaller than 120 [kΩ], and if R1+R2=500 [kΩ], R1 must be made smaller than 60 [kΩ].

In this way, by providing the ion current detecting resistor independently of the load resistor used to attenuate the LC resonance, and by selecting the resistance values of the two resistors so as to satisfy the Requirements 1 and 2 simultaneously, it becomes possible to improve the ion current detection accuracy dramatically compared with the prior art that does not have the load resistor. With the prior art, it is extremely difficult to satisfy the Requirements 1 and 2 simultaneously.

Figure 7:
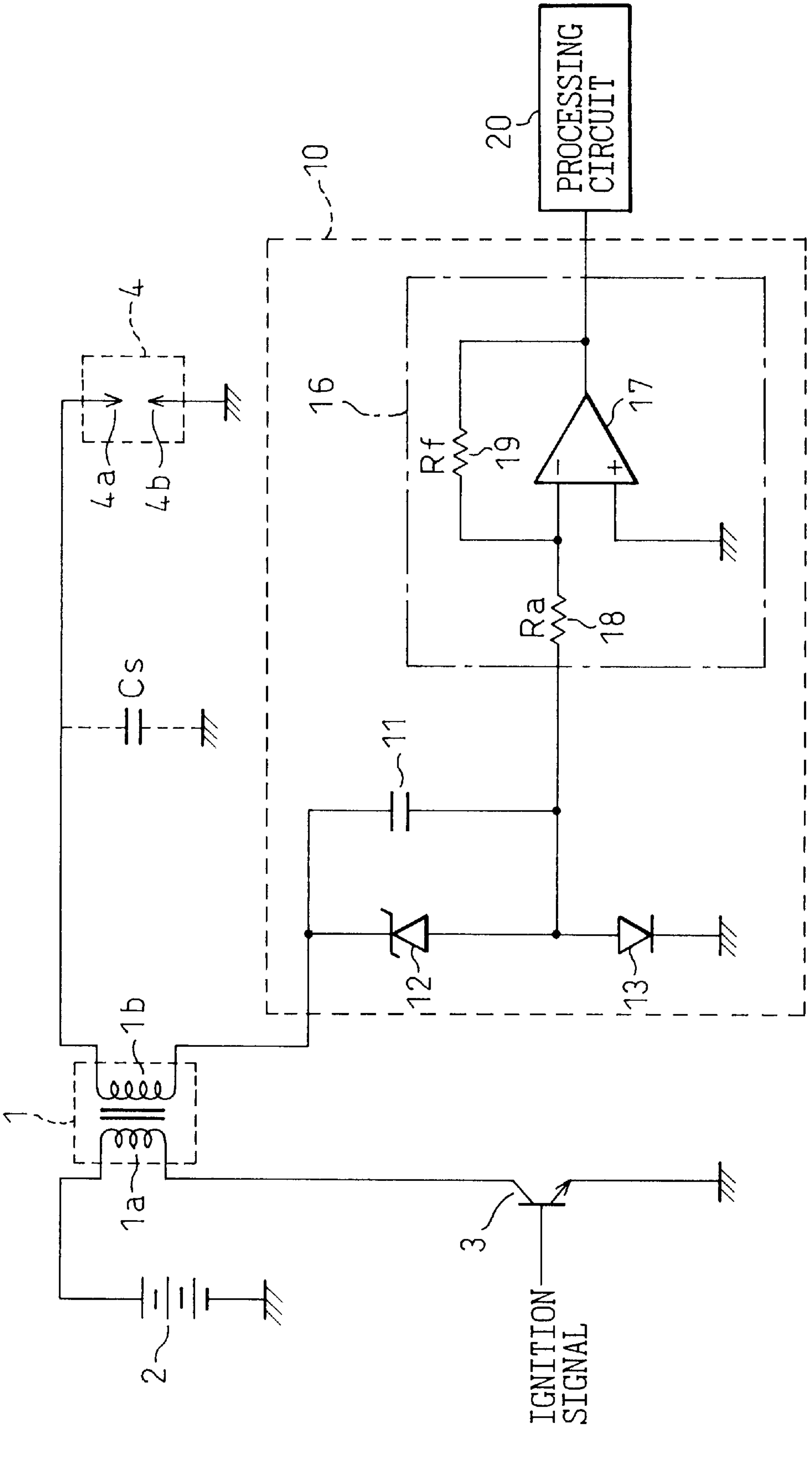
FIG. 7 is a diagram showing the circuit configuration of an ion current detection device according to a second embodiment of the present invention along with the ignition device.

FIG. 7 is a diagram showing a second embodiment that improves on the first embodiment shown in FIG. 1. In the inverting amplifier circuit 16 in the circuit of FIG. 1, the resistance value Ra of the input resistor 18 and the resistance value Rf of the feedback resistor 19 are chosen such that Rf=Ra, but if the ratio of Rf to Ra is set appropriately, it will become possible to incorporate the functions of the ion current detecting resistor 15 and load resistor 14 into the inverting amplifier circuit 16. In view of this, in the circuit of FIG. 7, the ion current detecting resistor 15 and load resistor 14 in FIG. 1 are omitted, and one end of the capacitor 11 is connected directly to the input resistor 18 of the inverting amplifier circuit 16.

Generally, it may be assumed that no current flows and no potential difference occurs between the differential input terminals of an operational amplifier, and therefore that its output voltage is constant regardless of the value of the load. That is, in the circuit of FIG. 7, since the inverting input terminal of the operational amplifier 17 can be regarded in effect as a ground, Ra in FIG. 7 can be considered as substituting for R1+R2 in FIG. 1. Further, the voltage dividing function expressed by R1/(R1+R2) and inverting function in FIG. 1 can be accomplished simultaneously by the voltage amplification −Rf/Ra in the inverting amplifier circuit of FIG. 7. Accordingly, the relations (1) and (2) previously given are now rewritten as $$Ra>100\ k\Omega$$

$$Vz\times(Rf/Ra)<Vb$$

According to the circuit of FIG. 7, the number of resistors can be reduced, affording reductions in the cost and size of the device.

As described above, the ion current detection device according to the present invention accomplishes two goals simultaneously, that is, to hold the ion current output voltage within a prescribed value to ensure proper operation of the processing device connected to its output side, and to reduce the decay time of the LC resonance associated with the ignition coil. This improves the accuracy of ion current detection. The present invention thus contributes greatly to improving the detection accuracy in detecting knock, preignition, misfire, etc. based on the ion current which reflects the combustion state of an internal combustion engine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An ion current detection device comprising:

a diode connected in series with a spark plug and an ignition coil secondary winding, the diode passing current only in a direction of a secondary current that flows when an ignition coil primary current is shut off;

a capacitor connected in series with said spark plug, said ignition coil secondary winding, and said diode, the capacitor acting as an ion current generating source;

a voltage-regulator diode connected in parallel to said capacitor, the voltage-regulator diode limiting a voltage to be charged into said capacitor by said ignition coil secondary current to within a specified value;

a series connection of a detecting resistor and a load resistor, connected in parallel with said doide and forming an ion current path together with said capacitor, said ignition coil secondary winding, and said spark plug, wherein a resistance value $R_1$ of said detecting resistor is less than a resistance value $R_2$ of said load resistor and wherein the resistance value $R_1$ of said detecting resistor and the resistance value $R_2$ of said load resistor are related by $$V_z\times\{R_1/(R_1+R_2)\}<V_b$$

where $V_z$ is the maximum voltage of said capacitor limited by said voltage-regulator diode, and $V_b$ is the supply voltage of said device; and an inverting circuit connected to a node between said detecting resistor and said load resistor.

2. An ion current detection device comprising:

a diode connected in series to a spark plug and an ignition coil secondary winding, the diode passing current only in a direction of a secondary current that flows when an ignition coil primary current is shut off;

a capacitor connected in series to said spark plug, said ignition coil secondary winding, and said diode, the capacitor acting as an ion current generating source;

a voltage-regulator diode connected in parallel to said capacitor, for limiting a voltage to be charged into said capacitor by said ignition coil secondary current to within a specified value;

an inverting amplifier circuit connected to a node between said capacitor and said diode, the inverting amplifier circuit inverting and amplifying a voltage value appearing at the node, wherein said inverting amplifier circuit forms together with said capacitor, said ignition coil secondary winding, and said spark plug, an ion current path, the inverting amplifier circuit comprising an operational amplifier, an input resistor connected to an inverting input terminal of said operational amplifier, and a feedback resistor directed from an output terminal of said operational amplifier to said inverting input terminal, wherein a resistance value $R_f$ of said feedback resistor is less than a resistance value $R_a$ of said input resistor and wherein the resistance value $R_f$ of said feedback resistor and the resistance value $R_a$ of said input resistor are related by $$V_z\times(R_f/R_a)<V_b$$

where $V_z$ is the maximum voltage of said capacitor limited by said voltage-regulator diode, and $V_b$ is the supply voltage of said device.

* * * * *